(12) United States Patent
Tsuchida et al.

(10) Patent No.: US 10,409,848 B2
(45) Date of Patent: Sep. 10, 2019

(54) TEXT MINING SYSTEM, TEXT MINING METHOD, AND PROGRAM

(71) Applicant: NEC Corporation, Minato-ku, Tokyo (JP)

(72) Inventors: Masaaki Tsuchida, Tokyo (JP); Kai Ishikawa, Tokyo (JP); Takashi Onishi, Tokyo (JP); Daniel Andrade, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 14/391,032

(22) PCT Filed: Apr. 24, 2013

(86) PCT No.: PCT/JP2013/062002
§ 371 (c)(1),
(2) Date: Oct. 7, 2014

(87) PCT Pub. No.: WO2013/161850
PCT Pub. Date: Oct. 31, 2013

(65) Prior Publication Data
US 2015/0120735 A1 Apr. 30, 2015

(30) Foreign Application Priority Data
Apr. 26, 2012 (JP) .................. 2012-101017

(51) Int. Cl.
*G06F 16/35* (2019.01)
*G06F 16/36* (2019.01)

(52) U.S. Cl.
CPC .......... *G06F 16/355* (2019.01); *G06F 16/374* (2019.01)

(58) Field of Classification Search
None
See application file for complete search history.

(56) References Cited

U.S. PATENT DOCUMENTS 4,613,946 A * 9/1986 Forman ................. G06T 17/005
715/841
2005/0278325 A1 * 12/2005 Mihalcea .............. G06F 17/277
(Continued)

FOREIGN PATENT DOCUMENTS

CN        102298576 A    12/2011
JP         11-15835 A     1/1999
(Continued)

OTHER PUBLICATIONS

Microsoft Computer Dictionary Fifth Edition. 5th ed. Microsoft Press, Redmond, Wash., 2002, p. 118 (Year: 2002).*
(Continued)

*Primary Examiner* — Kenneth M Lo
*Assistant Examiner* — Istiaque Ahmed (57) ABSTRACT

The present invention is a text mining system comprising a synonym cluster acquiring section configured to acquire synonym clusters from texts in text data to be analyzed, the synonym clusters each being a collection of synonymous texts, an implication relationship acquiring section configured to acquire implication relationships among the synonym clusters, and an implication graph generating section configured to generate an implication graph including vertices of synonym clusters and directed edges each indicating a direction from an implied synonym cluster to an implying synonym cluster from the implication relationships among the synonym clusters.

18 Claims, 10 Drawing Sheets

(56) References Cited

U.S. PATENT DOCUMENTS

2010/0131515 A1* 5/2010 Canright ............. G06F 17/3069
707/742
2011/0276866 A1* 11/2011 Harrington ....... G06F 17/30873
715/209

FOREIGN PATENT DOCUMENTS

| JP | 2002-56009 A | 2/2002 |
| JP | 2005-38386 A | 2/2005 |
| JP | 2005-63249 A | 3/2005 |
| JP | 2007-293685 A | 11/2007 |

OTHER PUBLICATIONS

International Search Report for PCT Application No. PCT/JP2013/062002, dated May 28, 2013.
Chinese Office Action for CN Application No. 201380021769.5 dated Nov. 4, 2016 with English Translation.

* cited by examiner

| ID | TEXT |
|---|---|
| 1 | X IS GOOD. |
| 2 | X IS A GOOD ONE. |
| 3 | DESIGN OF X IS GOOD. |
| 4 | X IS GOOD IN DESIGN. |
| ... | |
| 51 | LIQUID CRYSTAL OF X IS GOOD. |
| ... | |
| 110 | LIQUID CRYSTAL OF X IS CLEAR. |
| ... | |
| 2120 | X IS LIGHT-WEIGHT AND GOOD. |
| ... | |
| 3122 | X IS LIGHT-WEIGHT AND GOOD IN DESIGN. |
| ... | |

FIG. 4

| SYNONYM CLUSTER ID | ID | LABEL |
|---|---|---|
| 1 | 1,2,··· | X IS GOOD. |
| 2 | 3,4,··· | DESIGN OF X IS GOOD. |
| ··· | ··· | ··· |
| 110 | 51,65,··· | LIQUID CRYSTAL OF X IS GOOD. |
| ··· | ··· | ··· |
| 150 | 110,121,··· | LIQUID CRYSTAL OF X IS CLEAR. |
| ··· | ··· | ··· |
| 211 | 3122 | X IS LIGHT-WEIGHT AND GOOD IN DESIGN. |
| ··· | ··· | ··· |

SYNONYM CLUSTERS TRACEABLE
ALONG ONE EDGE

TEXT MINING SYSTEM, TEXT MINING METHOD, AND PROGRAM

This application is a National Stage Entry of PCT/JP2013/062002 filed on Apr. 24, 2013, which claims priority from Japanese Patent Application 2012-101017 filed on Apr. 26, 2012, the contents of all of which are incorporated herein by reference, in their entirety.

TECHNICAL FIELD

The present invention relates to a text mining system for obtaining, from text information, analysis of trends in contents thereof and useful knowledge.

BACKGROUND ART

Text mining is a data analysis technique for, from an input of text data written in a natural language, such as texts in a free comment field in a questionnaire, grasping overall trends of their contents and finding useful knowledge. For example, in a call center, this makes it possible to grasp contents in an inquiry from an answering note, or find problems or improvements for a product from a questionnaire about the product.

For example, PTL 1 is for extracting a syntactic dependency relationship between two or more words, summing up a frequency of appearances of syntactic dependencies, arranging words into predefined categories, and thereafter, displaying a network of syntactic dependency relationships of words (FIGS. 8, 10 and 12 in PTL 1). For example, categories may include the part of speech of words or the function in a sentence, such as a subject and an object. Moreover, in displaying the aforementioned network, display conditions regarding the category, word, and syntactic dependency relationship may be adjusted to achieve analysis at one's discretion from a wide-range overview to refined details of syntactic dependency relationships.

CITATION LIST

Patent Literature

PTL 1: JP P2007-293685A

SUMMARY OF INVENTION

Technical Problem

However, there is a problem that such a syntactic dependency-based inter-word network does not allow for analysis with contents of texts directly understood. A reason thereof is that contents of a text cannot be accurately read from syntactic dependency relationships. For example, assuming that there are two sentences: "The personal computer B operates slow when a lot of applications are started up" (Sentence 1) and "The personal computer B is started up slow" (Sentence 2), syntactic dependency relationships "personal computer B—slow" and "started up—slow" are included in common. However, "The personal computer B operates slow" in Sentence 1 is on condition that "when a lot of applications are started up," so that what is "started up" is different between Sentences 1 and 2; thus, information is partially read from the syntactic dependency relationships based on which these sentences are related to each other. Accordingly, to understand specific contents of a text, a human being should read a sentence in the text, including its syntactic dependencies, and rearrange it.

The present invention has been made in view of such a problem, and its object is to provide a text mining system, a text mining method, and a program capable of analysis with contents of texts directly understood.

Disclosure of the Invention

The present invention is a text mining system, characterized in comprising: a synonym cluster acquiring section for acquiring synonym clusters from texts in text data to be analyzed, said synonym clusters each being a collection of synonymous texts; an implication relationship acquiring section for acquiring implication relationships among said synonym clusters; and an implication graph generating section for generating an implication graph including vertices of synonym clusters and directed edges each indicating a direction from an implied synonym cluster to an implying synonym cluster from the implication relationships among said synonym clusters.

The present invention is a text mining method, characterized in comprising: for acquiring synonym clusters from texts in text data to be analyzed, said synonym clusters each being a collection of synonymous texts; acquiring implication relationships among said synonym clusters; and generating an implication graph including vertices of synonym clusters and directed edges each indicating a direction from an implied synonym cluster to an implying synonym cluster from the implication relationships among said synonym clusters.

The present invention is a program characterized in causing a computer to execute: synonym cluster acquiring processing of acquiring synonym clusters from texts in text data to be analyzed, said synonym clusters each being a collection of synonymous texts; implication relationship acquiring processing of acquiring implication relationships among said synonym clusters; and implication graph generating processing of generating an implication graph including vertices of synonym clusters and directed edges each indicating a direction from an implied synonym cluster to an implying synonym cluster from the implication relationships among said synonym clusters.

According to the present invention, texts are handled in an unchanged form, for which the synonym cluster acquiring section acquires clusters each comprised of texts having different expressions but the same content (which will be referred to as a synonym cluster). The text implication relationship acquiring section acquires implication relationships among all of the generated synonym clusters. As used herein, an implication relationship is defined such that a first text implies a second text in case that contents of the second text can be read from contents of the first text. According to the configuration of the present invention, since synonymous texts are already gathered and rearranged by the synonym cluster acquiring section, an implying side includes contents differential with respect to those of an implied side. The implication graph generating section generates an implication graph having vertices of synonym clusters and directed edges each drawn from the implied side to the implying side. A vertex in the implication graph is an original text remaining unchanged. Moreover, by tracing the implication graph in a direction of the directed edge, that is, from the implied side (start point) to the implying side (end point), analysis may be achieved as to how many texts there are that include contents of a text at the start point, and what specific texts they have.

Advantageous Effects of Invention

According to the present invention, analysis may be achieved with contents of texts directly understood.

DESCRIPTION OF EMBODIMENTS

Now embodiments of the present invention will be described with reference to the drawings.

First Embodiment

Figure 1:
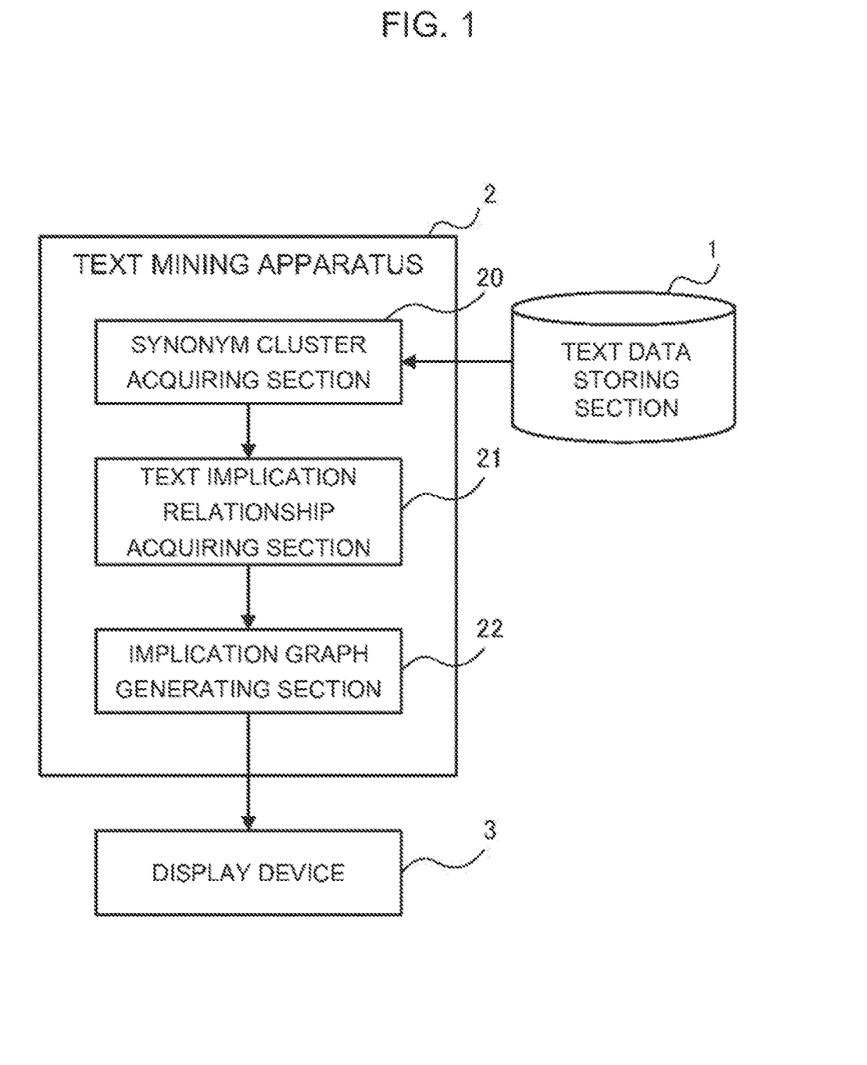
FIG. 1 is a block diagram showing a configuration of a first embodiment of the present invention.

A first embodiment of the present invention will be described in detail with reference to the drawings. FIG. 1 is a block diagram showing a configuration of the first embodiment of the present invention. Referring to FIG. 1, the embodiment of the present invention comprises a text data storing section 1, a text mining apparatus 2, and a display device 3.

The text data storing section 1 stores therein data of texts to be analyzed. A text to be analyzed is a unit whose contents are understandable by a human being, and particularly, is desirably a text comprised of one or more sentences.

The text mining apparatus 2 comprises a synonym cluster acquiring section 20, a text implication relationship acquiring section 21, and an implication graph generating section 22.

The synonym cluster acquiring section 20 retrieves data of the texts to be analyzed from the text data storing section 1, and acquires synonym clusters each comprised of texts having the same content. The synonym cluster acquiring section 20 may employ any method of deciding synonymity between texts.

The text implication relationship acquiring section 21 acquires implication relationships among synonym clusters generated by the synonym cluster acquiring section 20. The text implication relationship acquiring section 21 may employ any existing implication deciding method.

The implication graph generating section 22 generates an implication graph comprised of vertices of synonym clusters and directed edges each reflecting a direction of a decided implication between synonym clusters from a result of the implication decision made by the text implication relationship acquiring section 21.

The display device 3 displays an implication graph generated by the text mining apparatus 2.

Next, an operation of the present embodiment will be particularly described with reference to FIG. 1 and a flow chart in FIG. 2.

Figure 3:
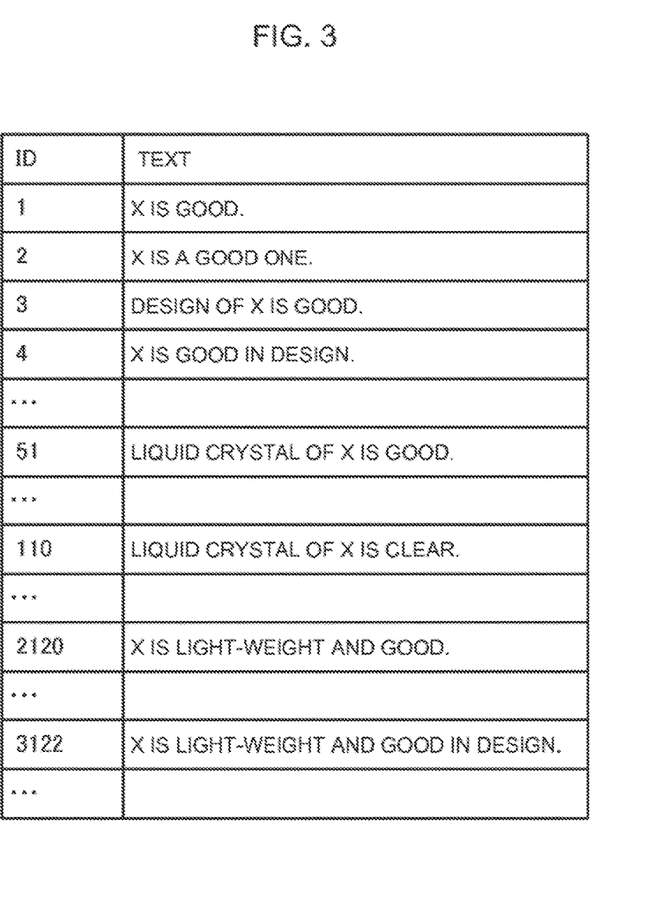
FIG. 3 is a diagram showing an example of data stored in a text data storing section.

First, the synonym cluster acquiring section 20 reads text data from the text data storing section 1, and conducts processing of acquiring a cluster comprised of synonymous texts on the read text data (Step S1). FIG. 3 shows an example of text data stored in the text data storing section 1. As shown in FIG. 3, data of a text is comprised of a text and an ID denoting its identifier. "X" represents a specific product name. Step S1 may employ any existing method of clustering synonymous texts. In the present description, the synonym cluster acquiring section 20 conducts clustering such that texts are considered to be synonymous in case that a cosine similarity between vectors composed of content words is equal to or greater than 0.8, and synonyms are considered to be also synonymous. For example, a text with ID 1 and a text with ID 2 result in vectors "(X, Good)," and they are considered to be synonymous because their similarity is 1.0. In case that another text having a similarity equal to or greater than 0.8 to the text with ID 2 is found, it is regarded as synonymous with the text with ID 1 even though it has a similarity less than 0.8 to the text with ID 1.

Figure 4:
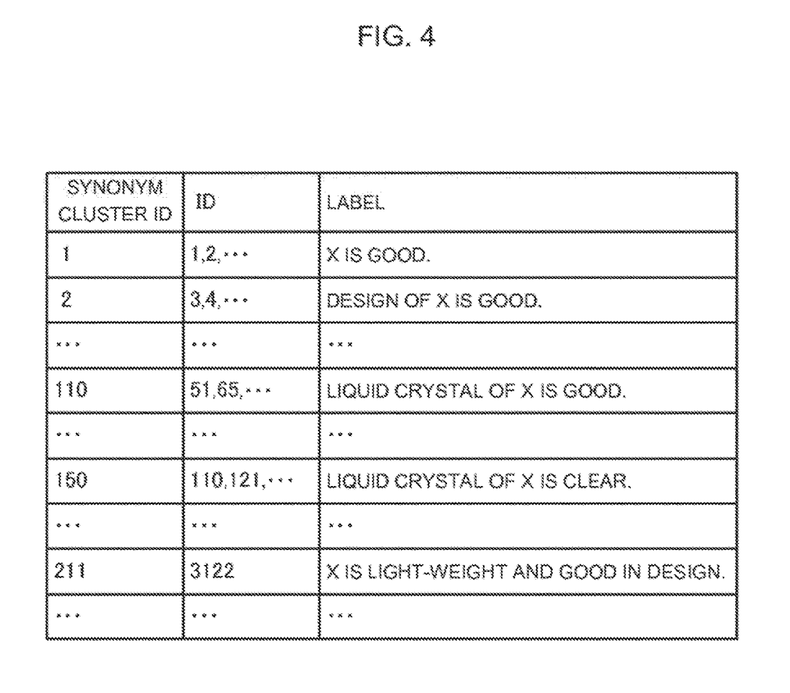
FIG. 4 is a diagram showing an example of a result output from a synonym cluster acquiring section.

FIG. 4 shows an example of synonym clusters obtained by the synonym clustering. A synonym cluster is comprised of an ID, which is an identifier of the synonym cluster, a list of IDs of texts that belong to the synonym cluster, and a label for the ID of the synonym cluster. The label may be created by extracting any text from the synonym cluster.

Next, the text implication relationship acquiring section 21 conducts processing of acquiring implication relationships among synonym clusters obtained by the synonym cluster acquiring section 20 (Step S2). The text implication relationship acquiring section 21 may employ any existing text implication deciding method. In the present description, the text implication relationship acquiring section 21 decides that a first text implies a second text in case that content words appearing in the first text covers 80% or more of those of the second text. As the text, the label of a synonym cluster is employed. At Step S2, pairs of synonym clusters are listed from all synonym clusters, and an implication relationship between each pair of synonym clusters is decided with one member as the first text and the other as the second text.

For example, when the first text is in a synonym cluster having ID 1, and the second text is in a synonym cluster having ID 2, the content words of the first text are "(X, Good)" and those of the second text are "(X, Design, Good)," so that the content word coverage is 66% (=2/3), which does not constitute an implication relationship. On the other hand, when the first text and the second text switch positions, the content words of the first text are "(X, Design, Good)" and those of the second text are "(X, Good)," resulting in coverage of 100% (=2/2), which is decided to constitute an implication relationship. This processing is applied to all pairs of synonym clusters. While a result of a decision on an implication between labels of synonym clusters is defined here as a result of a decision on an implication between synonym clusters, results of a decision on an implication between paired texts belonging to two synonym clusters may be combined to make an implication decision between synonym clusters because a synonym cluster has a plurality of texts. This may result in an improved likelihood to make a correct decision on an implication when a result of a decision on an implication between texts of the labels of synonym clusters would be incorrect.

Finally, the implication graph generating section 22 conducts processing of creating, from the results of the decision on an implication between synonym clusters obtained by the text implication relationship acquiring section 21, an implication graph comprised of vertices of the synonym clusters and directed edges from implied synonym clusters to implying synonym clusters (Step S3).

Figure 5:
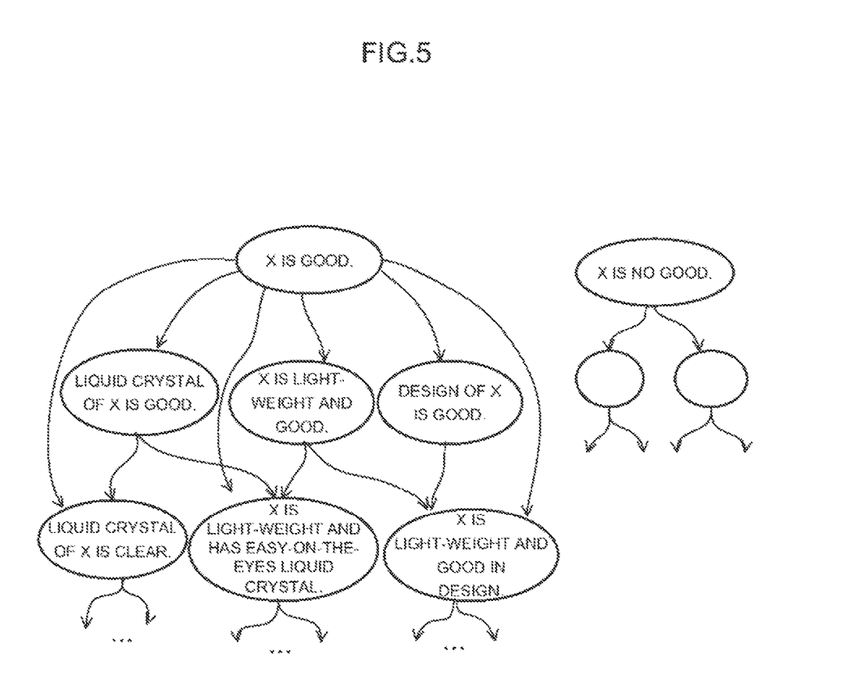
FIG. 5 is a diagram showing an example of a result output from an implication graph generating section.

FIG. 5 shows an example of a created implication graph. In the example shown in FIG. 5, a directed edge is drawn from an implied side to an implying side. The implication graph in FIG. 5 has two implication graphs comprised of a collection of texts implying "X is good" and a collection of texts implying "X is no good." In other words, this means that there is neither a text implied by "X is good" nor a text implied by "X is no good." For example, it can be seen from this implication graph that there are generally opinions "X is good" and "X is no good," and other opinions containing the meaning of (implying) "X is good" include "Liquid crystal of X is good," "X is light-weight and is good," "Design of X is good," and the like, by tracing arrows.

Since an implication relationship holds a transitive principle, an implication graph may sometimes become redundant. For example, while it is possible to trace from "X is good" via "Liquid crystal of X is good" to "Liquid crystal of X is clear," it is also possible to directly trace from "X is good" to a "Liquid crystal of X is clear." In this case, since to take an overview of texts, rearrangement according to a semantic hierarchical structure is desirable, it is more desirable to arrange the implication graph so that the fact that there is also a text "Liquid crystal of X is good" in between can be recognized, rather than directly tracing from "X is good" to "Liquid crystal of X is clear". Accordingly, in case that a plurality of paths are found between an arbitrary pair of vertices, the implication graph generating section 22 may construct an implication graph in which only the longest path are retained. The length of a path may be calculated using, for example, the number of edges included in that path. At that time, the implication graph on the left of FIG. 5 is generated as in FIG. 6. For example, paths tracing from "X is good" to "Liquid crystal of X is clear" include a path of a directly tracing edge and a path tracing along two edges routing via "Liquid crystal of X is good." In this case, the path of a directly tracing edge is eliminated by selecting the longest path. This processing may be applied to all pairs of vertices to construct an implication graph so as to have as deep a hierarchy as possible, as in FIG. 6.

Moreover, the implication graph generating section 22 may calculate a score of a likelihood of implication for an implication relationship between each pair of synonym clusters, and give the score to the implication relationship. By using the score, it is possible to implement processing of conducting analysis in which only edges of implication with higher possibility (with a score higher than a predetermined value) are retained. In this case, it may be contemplated that the length of a path is defined as a sum of the score of edges included in that path.

Figure 6:
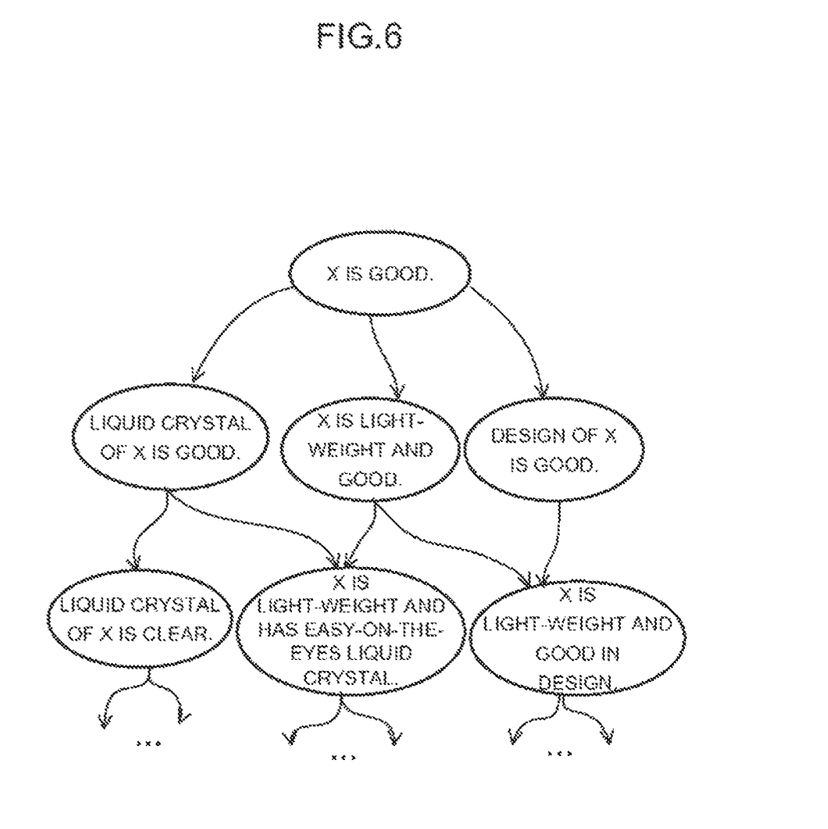
FIG. 6 is a diagram showing an example of a result output from the implication graph generating section.
Figure 7:
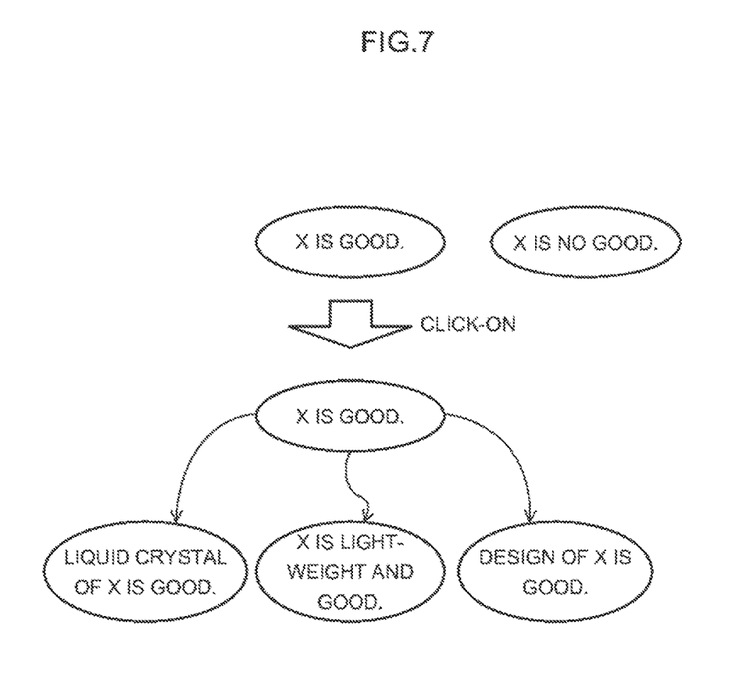
FIG. 7 is a diagram showing an example of a result from the implication graph generating section displayed on a display device.

The display device 3 displays the implication graph thus created by the implication graph generating section 22. Since the whole implication graph is extensive, a method of displaying desirably involves displaying a synonym cluster that cannot be traced from any vertex as a start point, and by clicking on the synonym cluster, developing proximate synonym clusters. FIG. 7 shows an example of the method of displaying the implication graph shown in FIG. 6. FIG. 6 has two vertices that cannot be traced from any synonym cluster: "X is good" and "X is no good." Once "X is good" is clicked on, display processing is conducted involving developing "Liquid crystal of X is good," "X is light-weight and good," and "Design of X is good" that can be traced from "X is good" along one edge. Other display methods may be applied here, including a method of developing a proximity that can be traced by a certain number of edges, instead of one edge, or display processing involving defining a limit such that a number smaller than a specified value of synonym clusters are displayed, and developing a proximity within that limit. Such display control processing may be achieved by the implication graph generating section 22 in the text mining apparatus 2 or by the display device 3.

According to the invention in the first embodiment, analysis may be achieved with contents of texts directly understood. A reason thereof is that texts are handled in an unchanged form, and an implication graph having vertices of synonym clusters and directed edges each representing an implication relationship is generated, so that a vertex represents information in a text as-is, and other texts substantially including contents of the text may be traced according to the implication graph.

Second Embodiment

Figure 8:
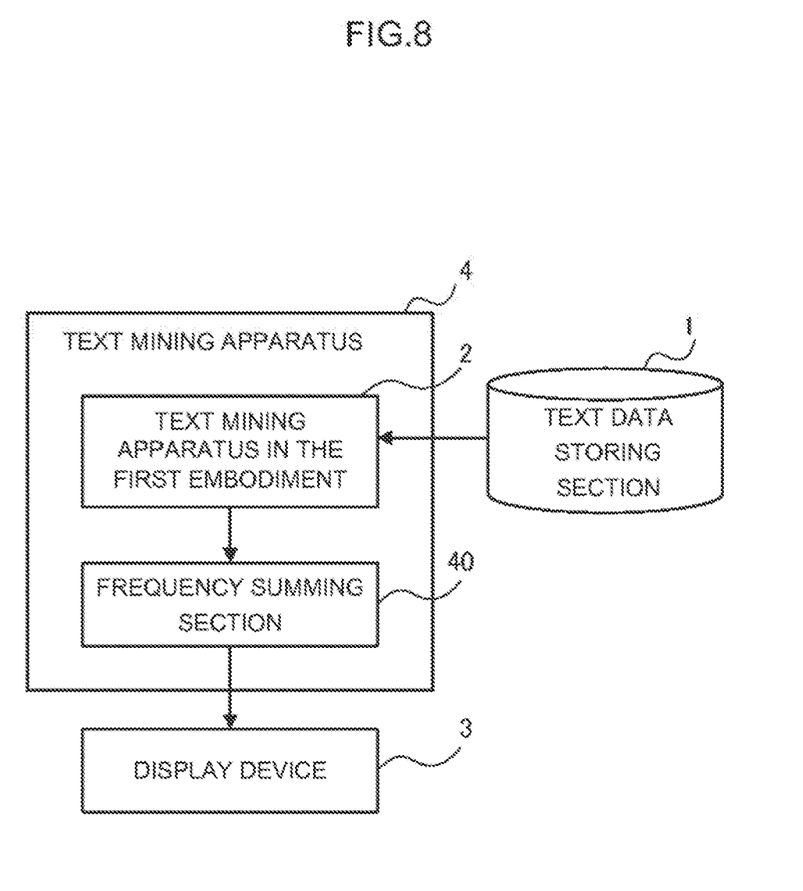
FIG. 8 is a block diagram showing a configuration of a second embodiment of the present invention.

Next, a second embodiment of the present invention will be described with reference to FIG. 8. Referring to FIG. 8, the second embodiment of the present invention further comprises a frequency summing section 40, in addition to the text mining apparatus in the invention of the first embodiment.

The frequency summing section 40 conducts processing of summing up a frequency of information represented by each synonym cluster using an implication graph generated by the invention of the first embodiment, and additionally using frequencies of information in synonym clusters that can be traced from that synonym cluster according to the implication graph.

An operation of the present embodiment will be particularly described with reference to FIG. 8 and a flow chart in FIG. 9.

Figure 2:
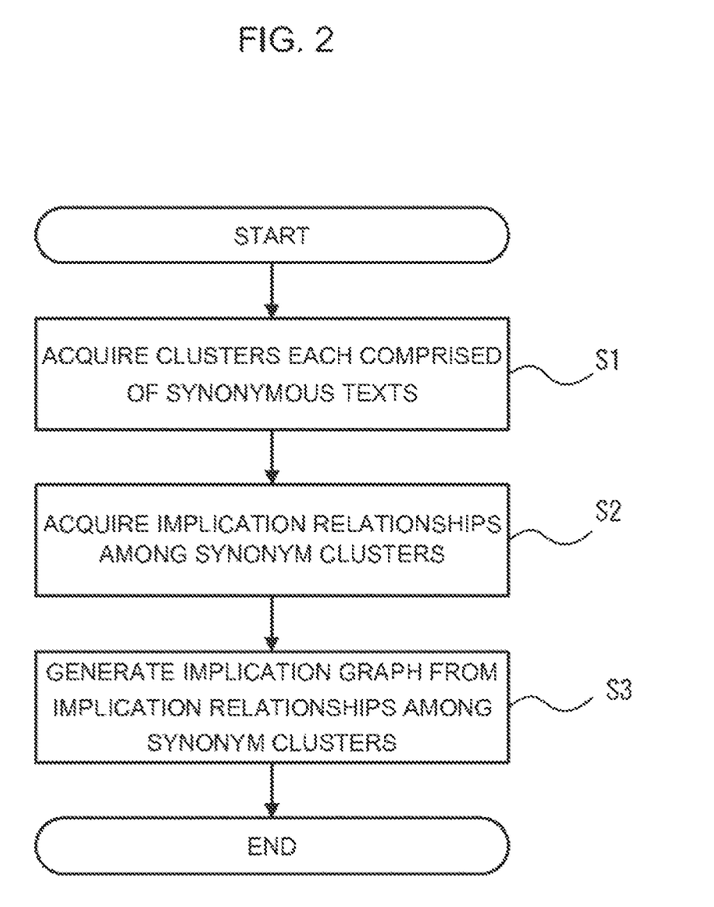
FIG. 2 is a flow chart showing an operation of the first embodiment of the present invention.
Figure 9:
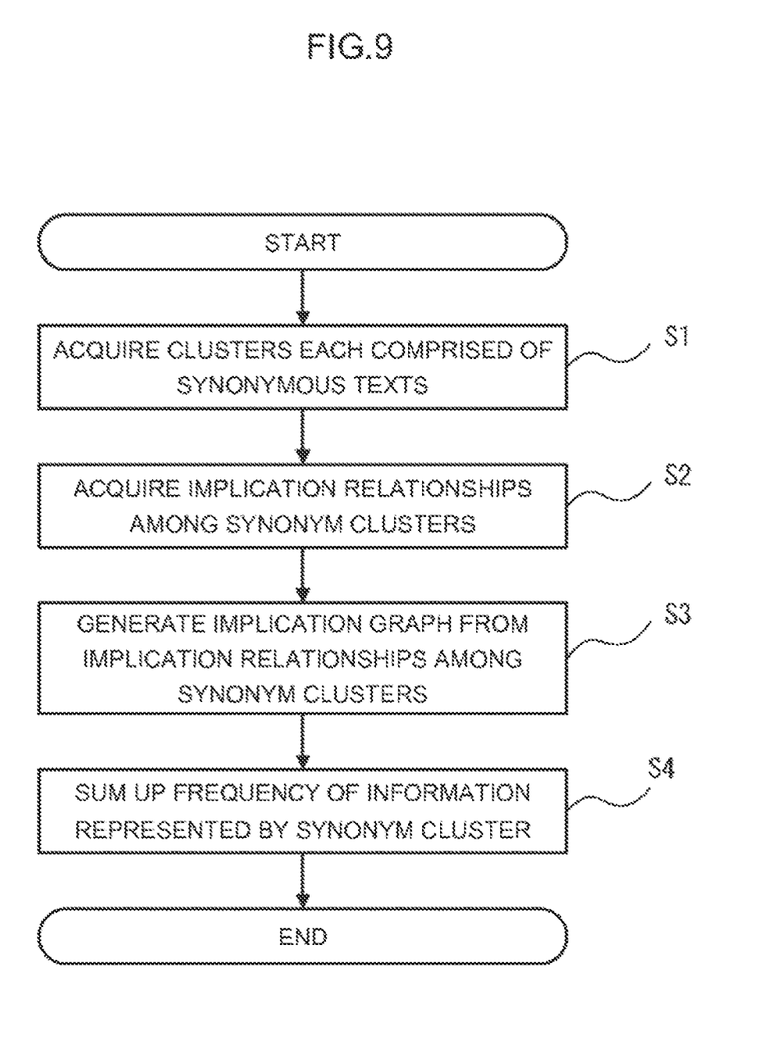
FIG. 9 is a flow chart showing an operation of the second embodiment of the present invention.

Steps S1 through S3 in FIG. 9 are similar to those in the flow chart in FIG. 2 showing the first embodiment. The frequency summing section 40 sums up the frequency of information in a synonym cluster of each vertex in an implication graph as the number of text IDs of texts included in the synonym cluster of that vertex plus those included in synonym clusters of vertices that can be moved from that vertex (Step S4). This is achieved by, for example, searching the implication graph from each vertex in a depth-first manner to list a collection of vertices that can be reached, and taking a sum of the numbers of the text IDs in the synonym clusters of the vertices. Besides, one may employ any algorithm capable of listing a collection of vertices that can be reached from a certain vertex.

Figure 10:
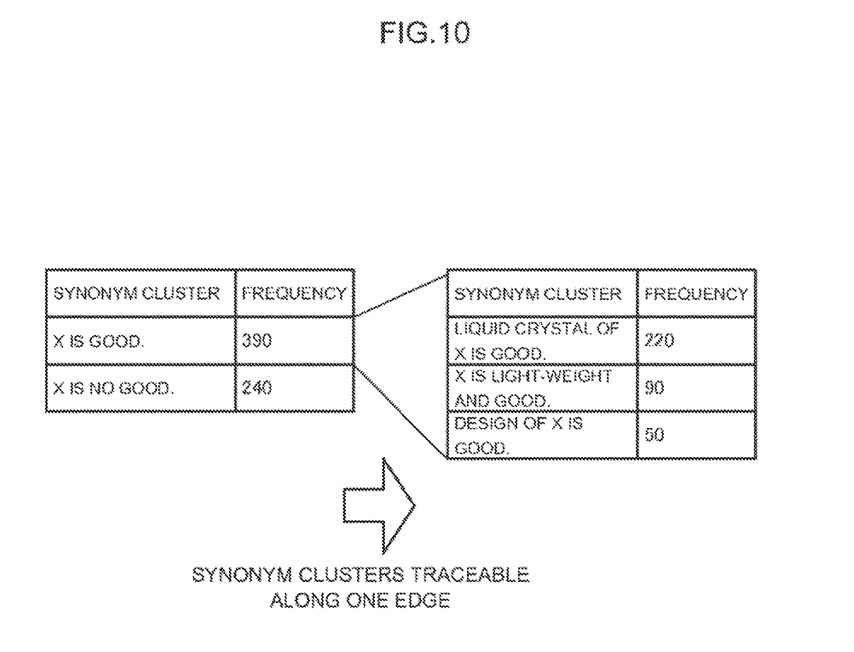
FIG. 10 is a diagram showing an example of a result from a frequency summing section displayed on the display device.

The display device 3 displays a result of the frequency summation by the frequency summing section 40. Basically, a method that may be contemplated involves displaying a result of frequency summation over each synonym cluster node in FIG. 7. Another method that may also be contemplated involves displaying a result in a tabular format. FIG. 10 shows an example of a result of frequency summation according to the implication graph in FIG. 7 displayed in a tabular format. First, there are two synonym clusters displayed: "X is good" and "X is no good," and respective frequencies of the synonym clusters are displayed. Once "X is good" is clicked on, commenced is processing of displaying synonym clusters that can be traced therefrom along one edge, and their frequencies in a table. Such display control processing may be achieved by the implication graph generating section 22 or the frequency summing section 40 in the text mining apparatus 2, or by the display device 3.

According to the invention in the second embodiment described above, it is possible to sum up the frequency, including texts in which the meaning of each text is substantially contained. A reason thereof is that the invention in the first embodiment can generate an implication graph according to the implication relationship, and synonym clusters that substantially contain, i.e., imply, information in a text at each vertex may be listed with reference to the implication graph.

The text mining apparatus in accordance with the embodiments of the present invention described above may be implemented by a CPU (Central Processing Unit) loading and executing an operation program, etc., stored in a storage section, or alternatively, they may be configured in hardware. Only part of functions of the embodiments described above may be implemented by a computer program.

Part or all of the preceding embodiments may be described as in the following appendices, although not limited thereto.

(Supplementary Note 1)
A text mining system, characterized in comprising:
a synonym cluster acquiring section for acquiring synonym clusters from texts in text data to be analyzed, said synonym clusters each being a collection of synonymous texts;
an implication relationship acquiring section for acquiring implication relationships among said synonym clusters; and
an implication graph generating section for generating an implication graph including vertices of synonym clusters and directed edges each indicating a direction from an implied synonym cluster to an implying synonym cluster from the implication relationships among said synonym clusters.

(Supplementary Note 2)
The text mining system as recited in Supplementary note 1, characterized in that:
in case that a plurality of paths are found between two said synonym clusters, said implication graph generating section creates an implication graph in which only edges constituting the longest path are retained.

(Supplementary Note 3)
The text mining system as recited in Supplementary note 1 or 2, characterized in further comprising:
a frequency summing section for summing up a frequency of information represented by each said synonym cluster additionally using frequencies of information in synonym clusters that can be traced from said synonym cluster in said implication graph.

(Supplementary Note 4)
The text mining system as recited in any one of supplementary notes 1 to 3, characterized in further comprising:
a display device for, in analyzing each synonym cluster using said implication graph, displaying proximate synonym clusters in said implication graph.

(Supplementary Note 5)
A text mining method, characterized in comprising:
acquiring synonym clusters from texts in text data to be analyzed, said synonym clusters each being a collection of synonymous texts;
acquiring implication relationships among said synonym clusters; and
generating an implication graph including vertices of synonym clusters and directed edges each indicating a direction from an implied synonym cluster to an implying synonym cluster from the implication relationships among said synonym clusters.

(Supplementary Note 6)
The text mining method as recited in Supplementary note 5, characterized in:
in case that a plurality of paths are found between two said synonym clusters, creating an implication graph in which only edges constituting the longest path are retained.

(Supplementary Note 7)
The text mining method as recited in Supplementary note 5 or 6, characterized in:
summing up a frequency of information represented by each said synonym cluster additionally using frequencies of information in synonym clusters that can be traced from said synonym cluster in said implication graph.

(Supplementary Note 8)
The text mining method as recited in any one of supplementary notes 5 to 7, characterized in:
in analyzing each synonym cluster using said implication graph, displaying proximate synonym clusters in said implication graph.

(Supplementary Note 9)
A program characterized in causing a computer to execute:
synonym cluster acquiring processing of acquiring synonym clusters from texts in text data to be analyzed, said synonym clusters each being a collection of synonymous texts;
implication relationship acquiring processing of acquiring implication relationships among said synonym clusters; and
implication graph generating processing of generating an implication graph including vertices of synonym clusters and directed edges each indicating a direction from an implied synonym cluster to an implying synonym cluster from the implication relationships among said synonym clusters.

(Supplementary Note 10)
The program as recited in Supplementary note 9, characterized in that:
in case that a plurality of paths are found between two said synonym clusters, said implication graph generating processing creates an implication graph in which only edges constituting the longest path are retained.

(Supplementary Note 11)
The program as recited in Supplementary note 9 or 10, characterized in causing said computer to further execute:
frequency summing processing of summing up a frequency of information represented by each said synonym cluster additionally using frequencies of information in synonym clusters that can be traced from said synonym cluster in said implication graph.

(Supplementary Note 12)
The program as recited in any one of supplementary notes 9 to 11, characterized in causing said computer to execute:
processing of displaying, in analyzing each synonym cluster using said implication graph, proximate synonym clusters in said implication graph.

While the present invention has been described with reference to the preferred embodiments, it is not necessarily limited to the embodiments described above, and may be practiced with several modifications within a scope of the technical idea thereof.

The present application claims priority based on Japanese Patent Application No. 2012-101017 filed on Apr. 26, 2012, disclosure of which is incorporated herein in its entirety.

REFERENCE SIGNS LIST

1 Text data storing section
2 Text mining apparatus
20 Synonym cluster acquiring section
21 Text implication relationship acquiring section
22 Implication graph generating section
3 Display device
4 Text mining apparatus
40 Frequency summing section

The invention claimed is:

1. A text mining system comprising:
a processor configured to
read text data to be analyzed, the text data being stored in a storage in an unchanged form without being manually rearranged;
calculate a similarity between texts of the text data to be analyzed, each text of the text data comprising a plurality of words;
generate synonym clusters from the texts in text data to be analyzed using the similarity between texts of the text data to be analyzed, said synonym clusters each being a collection of synonymous texts;
determine whether a first synonym cluster and a second synonym cluster are in an implication relationship, wherein said implication relationship is constituted such that the first synonym cluster implies the second synonym cluster in a case in which less than a predetermined percentage of content words present in said first synonym cluster is also present in said second synonym cluster and at least said predetermined percentage of content words present in said second synonym cluster is also present in said first synonym cluster;
generate an implication graph including vertices of synonym clusters and directed edges each indicating a direction from an implied synonym cluster to an implying synonym cluster from the result of determination of the implication relationships among said synonym clusters; and
output said implication graph including vertices of synonym clusters and directed edges each indicating the direction from said implied synonym cluster to said implying synonym cluster,
wherein each of the vertices represents a text of the synonym cluster corresponding to said each of the vertices.

2. The text mining system according to claim 1, wherein said processor is further configured to:
in case that a plurality of paths are found between two said synonym clusters, create the implication graph in which only edges constituting the longest path are retained.

3. The text mining system according to claim 1, wherein said processor is further configured to:
sum up a frequency of information represented by each said synonym cluster additionally using frequencies of information in synonym clusters that can be traced from said synonym cluster in said implication graph.

4. The text mining system according to claim 1, further comprising:
a display device configured to, in analyzing each synonym cluster using said implication graph, display a synonym cluster as a start point and synonym clusters that can be traced from said synonym cluster as the start point within a predetermined limit in said implication graph.

5. The text mining system according to claim 1, wherein each text of the text data comprises a sentence.

6. The text mining system according to claim 1, wherein the processor is further configured to generate the synonym clusters by determining whether a cosine similarity between a first vector including content words of a first text and a second vector including content words of a second text is greater than or equal to a predetermined threshold.

7. A text mining method comprising:
reading text data to be analyzed, the text data being stored in a storage in an unchanged form without being manually rearranged;
calculating a similarity between texts of the text data to be analyzed, each text of the text data comprising a plurality of words;
generating synonym clusters from the texts in text data to be analyzed using the similarity between texts of the text data to be analyzed, said synonym clusters each being a collection of synonymous texts;
determining whether a first synonym cluster and a second synonym cluster are in an implication relationship, wherein said implication relationship is constituted such that the first synonym cluster implies the second synonym cluster in a case in which less than a predetermined percentage of content words present in said first synonym cluster is also present in said second synonym cluster and at least said predetermined percentage of content words present in said second synonym cluster is also present in said first synonym cluster;
generating an implication graph including vertices of synonym clusters and directed edges each indicating a direction from an implied synonym cluster to an implying synonym cluster from the result of determination of the implication relationships among said synonym clusters; and
outputting said implication graph including vertices of synonym clusters and directed edges each indicating the direction from said implied synonym cluster to said implying synonym cluster,
wherein each of the vertices represents a text of the synonym cluster corresponding to said each of the vertices.

8. The text mining method according to claim 7, comprising:
in case that a plurality of paths are found between two said synonym clusters, creating the implication graph in which only edges constituting the longest path are retained.

9. The text mining method according to claim 7, comprising:
summing up a frequency of information represented by each said synonym cluster additionally using frequencies of information in synonym clusters that can be traced from said synonym cluster in said implication graph.

10. The text mining method according to claim 7, comprising:

in analyzing each synonym cluster using said implication graph, displaying a synonym cluster as a start point and synonym clusters that can be traced from said synonym cluster as the start point within a predetermined limit in said implication graph.

11. The text mining method according to claim 7, wherein each text of the text data comprises a sentence.

12. The text mining method according to claim 7, wherein the generating synonym clusters comprises determining whether a cosine similarity between a first vector including content words of a first text and a second vector including content words of a second text is greater than or equal to a predetermined threshold.

13. A non-transitory computer readable storage medium storing a program causing a computer to execute the steps of:
   reading text data to be analyzed, the text data being stored in a storage in an unchanged form without being manually rearranged;
   calculating a similarity between texts of the text data to be analyzed, each text of the text data comprising a plurality of words;
   generating synonym clusters from the texts in text data to be analyzed using the similarity between texts of the text data to be analyzed, said synonym clusters each being a collection of synonymous texts;
   determining whether a first synonym cluster and a second synonym cluster are in an implication relationship, wherein said implication relationship is constituted such that the first synonym cluster implies the second synonym cluster in a case in which less than a predetermined percentage of content words present in said first synonym cluster is also present in said second synonym cluster and at least said predetermined percentage of content words present in said second synonym cluster is also present in said first synonym cluster;
   generating an implication graph including vertices of synonym clusters and directed edges each indicating a direction from an implied synonym cluster to an implying synonym cluster from the result of determination of the implication relationships among said synonym clusters; and
   outputting said implication graph including vertices of synonym clusters and directed edges each indicating the direction from said implied synonym cluster to said implying synonym cluster,
   wherein each of the vertices represents a text of the synonym cluster corresponding to said each of the vertices.

14. The non-transitory computer readable storage medium according to claim 13, wherein said program causes said computer to further execute:
   in case that a plurality of paths are found between two said synonym clusters, creating the implication graph in which only edges constituting the longest path are retained.

15. The non-transitory computer readable storage medium according to claim 13, wherein said program causing said computer to further execute:
   summing up a frequency of information represented by each said synonym cluster additionally using frequencies of information in synonym clusters that can be traced from said synonym cluster in said implication graph.

16. The non-transitory computer readable storage medium according to claim 13, wherein said program causes said computer to further execute:
   in analyzing each synonym cluster using said implication graph, displaying a synonym cluster as a start point and synonym clusters that can be traced from said synonym cluster as the start point within a predetermined limit in said implication graph.

17. The non-transitory computer readable storage medium according to claim 13, wherein each text of the text data comprises a sentence.

18. The non-transitory computer readable storage medium according to claim 13, wherein the generating synonym clusters comprises determining whether a cosine similarity between a first vector including content words of a first text and a second vector including content words of a second text is greater than or equal to a predetermined threshold.

* * * * *